(12) United States Patent
DeLuisi et al.

(10) Patent No.: US 11,392,873 B2
(45) Date of Patent: Jul. 19, 2022

(54) SYSTEMS AND METHODS FOR SIMULATING ORDERS AND WORKFLOWS IN AN ORDER ENTRY AND MANAGEMENT SYSTEM TO TEST ORDER SCENARIOS

(71) Applicant: Level 3 Communications, LLC, Broomfield, CO (US)

(72) Inventors: Michael DeLuisi, Broomfield, CO (US); Chad A. Hartman, Erie, CO (US); Yaolin D. Wu, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1465 days.

(21) Appl. No.: 15/198,241

(22) Filed: Jun. 30, 2016

(65) Prior Publication Data
US 2017/0004423 A1    Jan. 5, 2017

Related U.S. Application Data

(60) Provisional application No. 62/187,214, filed on Jun. 30, 2015.

(51) Int. Cl.
*G06Q 10/06* (2012.01)
*G06Q 30/06* (2012.01)

(52) U.S. Cl.
CPC ....... *G06Q 10/0633* (2013.01); *G06Q 10/067* (2013.01); *G06Q 30/0635* (2013.01)

(58) Field of Classification Search
USPC ........................................................ 705/7.27
See application file for complete search history.

(56) References Cited

U.S. PATENT DOCUMENTS

| | | | | |
|---|---|---|---|---|
| 7,738,403 B2 * | 6/2010 | Ottamalika | ............. | H04L 12/66 370/255 |
| 9,635,191 B2 * | 4/2017 | Sharma | ................ | H04Q 3/0091 |
| 2005/0049905 A1 * | 3/2005 | Olesen | ................. | G06Q 10/087 705/28 |
| 2014/0177821 A1 * | 6/2014 | Ristock | .............. | G06Q 10/0631 379/266.08 |
| 2016/0110662 A1 * | 4/2016 | Dispoto | ................. | G06Q 10/06 705/7.27 |
| 2017/0078338 A1 * | 3/2017 | Arora | .................. | H04L 65/1093 |

* cited by examiner

*Primary Examiner* — Alan Torrico-Lopez

(57) ABSTRACT

An order entry and order management network is disclosed. Event log data associated with a completed real order and relevant to a scenario is accessed by a computing device. A template is built for the scenario using the event log data. The template is modified as needed based upon predetermined specifications of the scenario. A simulated order is generated by applying the event log data to the template. A simulated workflow is initiated based upon the simulated order. The simulated workflow is a virtualized workflow monitored by the computing device to test the scenario. The computing device monitors network traffic associated with orders. The computing device communicates aspects of the event log data to systems of the order entry and order management network when the computing device identifies network traffic associated with the simulated order in order to process the simulated workflow and test the scenario.

22 Claims, 7 Drawing Sheets

SYSTEMS AND METHODS FOR SIMULATING ORDERS AND WORKFLOWS IN AN ORDER ENTRY AND MANAGEMENT SYSTEM TO TEST ORDER SCENARIOS

CROSS REFERENCE TO RELATED APPLICATION

This application claims priority under 35 U.S.C. § 119 from U.S. Provisional Application No. 62/187,214 entitled "VIRTUALIZED INTEGRATION EVENT SIMULATOR FOR ORDER ENTRY AND MANAGEMENT SYSTEM," filed on Jun. 30, 2015, the entire contents of which are fully incorporated by reference herein for all purposes.

TECHNICAL FIELD

Aspects of the present disclosure relate generally to electronic order entry and management systems; and more particularly to systems and methods for simulating orders and workflows in an electronic order entry and management system to test order scenarios.

BACKGROUND

A business enterprise, such as a telecommunications service provider, may utilize one or more order entry and management systems to facilitate the entry and processing of orders and extend services to customers. An order may be received in an order entry domain and processed in an order management domain to fulfill the order. Order entry and management systems vary in structure and complexity but generally involve continual maintenance and monitoring to ensure that orders are being efficiently processed by such systems.

As businesses grow or as businesses acquire additional business entities, different challenges may arise with respect to processing workflows in the order entry and order management system. For example, when the telecommunications service provider acquires another business entity, the acquired business entity may have a different order entry or order management system with different formats, protocols, and the like. The telecommunications company may need to address such differences during integration of systems of the acquired business entity. The complexity of technologies offered by a telecommunications service provider may further involve unique considerations. In some cases, for example, a mixture of technology services and products may be requested via an order entry domain which may require multiple participants, under the direction of the telecommunications service provider, to implement workflows and complete tasks in order to respond to and fulfill such orders. The telecommunications service provider may desire efficient means of testing workflows implemented to complete orders especially when workflows involve interaction with an acquired business entity or multiple participants. Testing workflows for order entry systems may aid with fulfilling complicated orders, identifying possible failure points, and the like.

It is with these observations in mind, among others, that various aspects of the present disclosure were conceived and developed.

SUMMARY

A need exists for enhanced order entry and management systems with improved order and workflow simulation features in order to address order management and workflow considerations. Accordingly, one implementation of the present disclosure may take the form of a method of simulating workflows for order entry and management, comprising: connecting a computing device in a network flow path between an enterprise service bus (ESB) and a business process management system (BPMS) such that network traffic associated with orders communicated between the BPMS and ESB flows through the computing device; utilizing the computing device comprising at least one processing unit in communication with at least one tangible storage media, the tangible storage media further including computer executable instructions for performing operations of: accessing event log data for a previously completed real order from an event log database, the event log data comprising key identification numbers (IDs) and information about one or more tasks associated with the previously completed real order; generating simulated order identifiers for the key IDs of the event log data that differentiate real orders from simulated orders; generating a template using the event log data, the template associated with an order scenario based on the previously completed real order; generating a simulated order by applying the event log data to the template, the simulated order comprising the simulated order identifiers; and executing the simulated order to initiate a simulated workflow.

Another implementation of the present disclosure may take the form of a system for order entry and management with order simulation, comprising: an enterprise service bus (ESB) operative to receive and normalize incoming order traffic; a business process management system (BPMS) in communication with the ESB and adapted to initiate and manage on or more workflows for the incoming order traffic; and a computing device coupled between the enterprise service bus and the BPMS, the computing device adapted to: proxy network traffic associated with orders between the ESB and the BPMS including network traffic associated with real orders; build at least one template based upon event log data, the at least one template defining a simulated workflow for an order scenario; generate a simulated order using the at least one template and event log data to initiate the simulated workflow for the order scenario; and process the simulated workflow by communicating aspects of the event log data to the BPMS to test the order scenario.

Another implementation of the present disclosure may take the form of a method of simulating a workflow in an order entry and management system, comprising: utilizing a computing device comprising at least one processing unit in communication with at least one tangible storage media, the tangible storage media further including computer executable instructions for performing operations of: generating a template based upon event log data of a previously completed real order that is relevant to a scenario of the order entry and management system; generating a simulated order by applying the event log data to the template; and executing the simulated order to initiate a simulated workflow and test the scenario.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
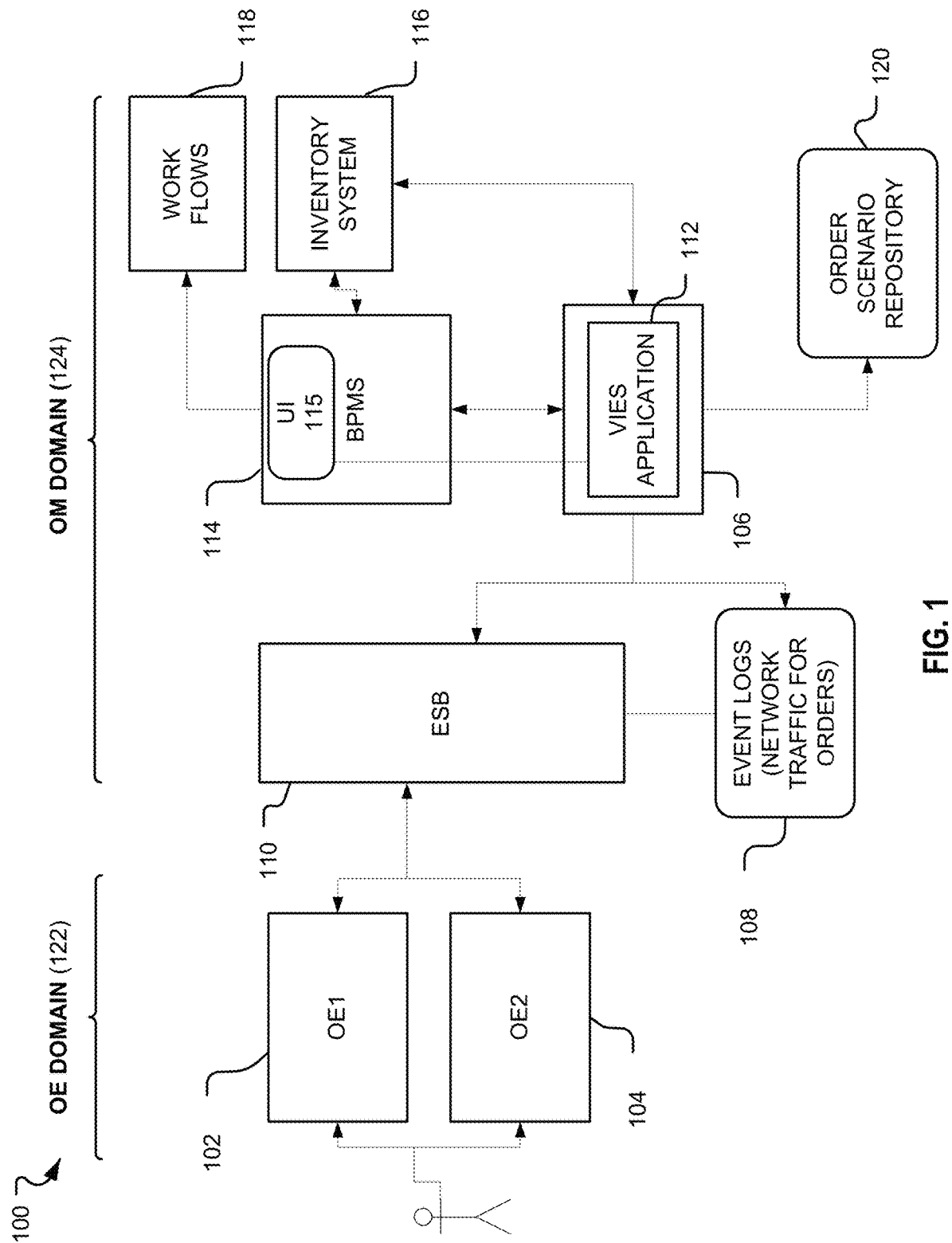
FIG. 1 illustrates an exemplary system view of an order entry and management network with a virtual integration event simulator (VIES) application, according to aspects of the present disclosure.

Aspects of the present disclosure involve systems, methods, and/or apparatuses for simulating an order and a workflow in an order entry and management network in order to test order scenarios and optimize workflows for the network. In one aspect, the application may be referred to as a virtual integration event simulator (VIES) application that is deployed and operable on a hardware computing system to perform operations discussed herein. The VIES application may comprise several layers such as a simulated order template builder layer, an order simulator layer, and an event orchestrator layer implemented within an order management domain of the network. The VIES application may be executed by one or more computing devices within the order management domain and may be coupled as an intermediary between an enterprise service bus (ESB) (operable to normalize orders that ingress into the network from different order entry systems); and a business process management system (BPMS) (operable, as a process agent, to manage workflows based upon parameters of the orders received from the order entry systems and the ESB). In one embodiment, the order entry and management network may comprise a configuration that directs (or points) network traffic associated with orders that ordinarily flows from the ESB to the BPMS to instead pass through the VIES application, so that such network traffic associated with orders flows through the VIES application before the network traffic is passed to the BPMS. According to the same configuration, network traffic associated with orders flowing in the opposite direction, that may ordinarily be passed to the ESB directly from the BPMS, may instead be diverted to flow through the VIES application. The network traffic associated with orders may include network traffic associated with both simulated orders and real orders. Real orders may include orders that are not created by the VIES application but instead originate from the order entry domain and need to actually be processed and fulfilled to extend services to customers.

The VIES application may generate simulated orders to test order scenarios, and interact with network traffic associated with the simulated orders while leaving network traffic associated with real orders uninterrupted. In other words, the VIES application may permit network traffic associated with real orders to pass through the VIES application to its intended destination. Being an intermediary, or part of the flow path for network traffic associated with all orders, the VIES application may retrieve data or otherwise have access to event logs based on network traffic associated with previously completed real orders (past or previous real orders that have already been processed and completed within the order management network). The VIES application may build a template for a simulated order (to test an order scenario) based on event log data of a previously completed real order. The simulated order may be executed using the template, event log data, and optional predetermined data specific to an order scenario. Once the simulated order is executed, the BPMS may create a simulated workflow based upon information of the simulated order. The simulated workflow may be created similar to and resemble a workflow created for a real order but instead be associated with the simulated order. The VIES application may orchestrate network traffic associated with the simulated order and workflow as the BPMS and/or other systems issue network traffic for the simulated workflow and attempt to process and complete the simulated workflow.

Aspects of a simulated workflow, or certain tasks, may be virtualized, pre-completed, or omitted. Specifically, for example, the VIES application may intercept certain network traffic associated with the simulated order and simulated workflow in the network (such as network traffic from the BPMS) and respond back with information derived from the event log data (or other predetermined information), so that no real action is taken (by systems other than the BPMS and the VIES application) with respect to at least some of the tasks of the simulated workflow. In other words, certain tasks may be virtualized or pre-completed by the VIES application (and reported to the BPMS), which may be useful where an order scenario is being tested by a new (simulated) workflow that is based at least in part on a past workflow because certain tasks of the past workflow may be common to tasks of the new workflow for the order scenario. Because the VIES application can virtualize certain tasks of a simulated workflow in this fashion, testing of the new workflow can be conducted with optimal efficiency by not having to test certain tasks. For example, in some embodiments, certain communications from the BPMS to other systems of the order management domain (such as communications to assign or request status about tasks of the simulated workflow), may be intercepted by the VIES application such that the intended systems may not ever receive such communications. In other embodiments, requests may be made to certain systems of the order management domain to test other (new) tasks of the simulated workflow, including new tasks that have not yet been implemented by a previous real order, such that the simulated workflow may include some interaction with systems of the order management domain. Requests to a system about a new task to be completed may merely request whether the task could be completed, without instructing the system to actually take substantive action for the new task (such as configuring a device). As such, order scenarios may be tested (it may be determined whether all of the tasks of a simulated workflow for an order scenario would be completed if the simulated workflow was associated with a real order for services that need to be provisioned to customers)

without instructing systems of the order management domain to actually provision services. Or, using the simulated order/workflow information systems may be affirmatively instructed not to provision services such that little or no action from certain systems of the order management domain (other than, in some embodiments, configuring certain systems to possibly report back that a task of a simulated workflow could be completed if instructed) may take place. In some embodiments, the simulated order and simulated workflow may be configured with identifiers, using specifications of the template, to alert systems not to provision services for such simulated orders and workflows. The simulated order and simulated workflow may be used to test an order scenario, identify possible workflow failure points, and monitor the status of different workflows and order scenarios in the network.

Real orders that are completed in an order entry and management network may comprise an order scenario. An order scenario may be understood as a request for services from a customer. For example, in a previously completed real order, order #1234, a customer may have requested a virtual private network (VPN) connection, such that it may be said the order #1234 defines an order scenario for provisioning a VPN. The order #1234 may further be associated with a workflow that was implemented to address the order scenario for the customer. In other words, at least one workflow may have been implemented to address the order scenario and request for services by the customer as defined by the order #1234. More specifically, for the exemplary order #1234, the BPMS may have initiated a workflow to respond to the order scenario for the VPN, the workflow comprising a plurality of tasks to extend the requested services of the VPN to the customer. Tasks of the workflow may have included, for example, configuring network devices, retrieving information from an inventory database, and the like. Because the subject workflow was implemented for order #1234, which is a previously completed real order, the subject workflow may be referred to as a past or previous workflow.

In some embodiments, it may be desired to test an existing (or previously implemented) scenario from a previously completed order. For example, it may be desired to test the order scenario for provisioning a VPN by generating a simulated order, and initiating a simulated workflow (similar to a workflow of order #1234) to determine if the order management domain can still successfully complete such an order and address such an order scenario. Such testing of previously used scenarios may be important where inventory systems have changed, where systems that were previously assigned tasks to address the order scenario for provisioning a VPN have changed, and the like. In other words, it may desired to test an order scenario using simulated orders and workflows in order to identify and/or otherwise determine if there are problems or possible failure points in the order management domain. For example, if a workflow associated with a particular order scenario fails to extend services to a customer for whatever reason, a simulated order and workflow may be initiated to identify specifically where in the process the workflow is failing to provide the services of the order scenario (e.g. what task of the workflow is failing or not being completed). By simulating a workflow, it may be determined that the system is failing to extend services for a particular order scenario because one or more tasks are not getting completed by a particular element of the order management domain. In other embodiments, it may be desired to build a new scenario and generate a workflow for the new scenario to determine how elements of the order management domain would respond to the new scenario. For example, a new scenario may be one that modifies/augments the example scenario of provisioning a VPN, by adding twenty Voice over Internet Protocol (VoIP) devices. As explained in greater detail below, information about previously completed real orders, including past workflows and event log data, may be used to generate a simulated order that addresses a modification or augmentation to an existing or prior scenario and test the new scenario.

The simulated order template builder of the VIES application may utilize information about previously completed real orders to build templates in order to test scenarios by generating simulated orders and workflows. A previously completed real order may be used for templates because a previously completed real order may provide useful information about how the previously completed real order was processed in the order management domain, including information about previously implemented workflows and tasks. In one embodiment, the simulated order template builder of the VIES application may retrieve data from an event log database associated with the ESB for a previously completed real order. In particular, a real order identification number (ID) associated with the previously completed real order (a past or previous real order that has already been processed and completed within the order management network) may be submitted to the VIES application to retrieve event log data from the event log database that is associated with the previously completed real order (with the specific real order ID). The event log data may include all transactions (memorialized in event logs) that have passed through the ESB for the specific previously completed real order. The previously completed real order associated with the real order ID may be associated with a particular order scenario. It may be desired to test the order scenario, modify the order scenario, or create a new order scenario based on aspects of a known scenario. In addition, the previously completed real order may have utilized a past workflow (workflow previously processed by the BPMS to fulfill the previously completed real order) to fulfill aspects of the order (and complete the order). Because the previously completed real order is associated with an order scenario, it should be understood that the past workflow may also be associated with the order scenario of the previously completed real order. In other words, the past workflow used for a previously completed real order was initiated to address providing services to a customer in view of a particular order scenario. It may be desired to test or simulate an order scenario (by generating a simulated order and initiating a simulated workflow) that is based on aspects of a previously completed real order, a past workflow of the previously completed real order, and/or a previously defined order scenario associated with the previously completed real order. In other words, such an order scenario to be tested, may incorporate aspects of a past workflow, and may optionally involve additional tasks, modified tasks, additional information, and the like that was not addressed by the past workflow. As such, it may be desired to test the order scenario by simulating an order and workflow specific to the scenario in the order management domain. In some embodiments, where the order scenario has already been implemented for a previously completed real order, event log data associated with the previously completed real order may provide helpful predetermined order parameters and potentially all or a majority of a past workflow and tasks needed to recreate, or test the order scenario in the order management domain. In other embodiments, it may be desired to test a plurality of order scenarios or build upon, augment, or modify scenarios.

To simulate an order and workflow (and test an order scenario), the simulated order template builder may be utilized to build a template that can be used to generate a simulated order, and then the simulated order may be deployed to the BPMS which may initiate a simulated workflow to test an order scenario. To build a template specific to a particular order scenario (S2), the simulated order template builder may retrieve event log data that is relevant to the order scenario. For example, a previously completed real order #7777 may be associated with a previous order scenario S1. The order scenario, S2, may include the same or similar attributes as (or share attributes with) the order scenario S1 of the real order #7777. As such, event log data for the previously completed real order #7777 would be relevant and may be retrieved to build a template for the order scenario S2 due to the similarities between the order scenario S2 and the order scenario S1 of the previously completed real order #7777. In some embodiments, the order scenario S2 may be identical to the order scenario S1 of real order #7777.

Continuing the above example, transactions and event log information of the event log data may be used by the simulated order template builder to generate a template T for the order scenario S2 based upon aspects of the previously completed real order #7777. The event log data may indicate, for example, that a past workflow W1 was implemented for the previously completed real order #7777 to address the order scenario S1. Given the relationship between the order scenario S2 and the order scenario S1, the template T may incorporate aspects of the workflow W1. In other words, the template T for the order scenario S2 may be configured to generate a simulated order that initiates a simulated workflow W2 that is similar, shares attributes (such as tasks) with, or is identical to the past workflow W1.

The template T may include a plurality of fields and may define aspects of the past workflow W1 used to provision the specific previously completed real order #7777. The template T may comprise predetermined instructions for communicating with different systems of the network to address the order scenario S2 and simulate the workflow W2. The template T may define a complete list of steps, tasks, values, and dependencies to provision a simulated order associated with the order scenario S2 (based on the information retrieved from the real order #7777). For example, a task 1 may need to complete before task a 2, which may need to complete before a task 3, and the like. Further, where the template T is being built for a new order scenario (S2) or an order scenario that modifies the order scenario S1, that requires new tasks or information, the template can be modified or customized to reflect such tasks and information by adding fields to the template, or prepopulating the template with keys or parameters.

The event log data retrieved may contain a number of key identification numbers (IDs), unique to the specific previously completed real order. Such key IDs may be aggregated or correlated for analysis using one or more queries to the event log database. For example, event log data retrieved to build the template T using information about the previously completed real order #7777 may contain values for key IDs specific to the previously completed real order #7777. In some embodiments, certain key IDs associated with a specific previously completed real order are unique to that particular order such that the same key IDs may not be used for future orders. The simulated order template builder may comprise logic and instructions to generate simulated order identifiers for the key IDs of the event log data. In some embodiments, the VIES application may tokenize values for key IDs to identify simulated orders. As such, where the template T is used to transmit a simulated order to the network to test the order scenario S2, the simulated order may be submitted with information that is substantially similar to the specific previously completed real order #7777, but by nature of modifying values of certain key IDs of the simulated order, the simulated order may be interpreted by the order management domain as a "new" or different order (despite being a simulated order based at least in part on the specific previously completed real order #7777) as the simulated order is passed through the network. In some embodiments, a scenario can be built using a template that modifies a previously completed real order. As such, values of certain key IDs may in fact be replicated from the previously completed order to the data of the scenario. Such an example may be useful to test a possible augmentation to a previous order and an associated workflow to augment the order. For example, a service ID of the key IDs may be tokenized with a simulated order identifier, thereby changing the value of the service ID (which may be an ID that cannot be reintroduced in the order management domain), but a key ID associated with a particular customer and a key ID associated with a past order ID may be replicated (or left the same). As such, systems of the order management domain, such as the VIES application and the BPMS, may differentiate the simulated order from a real order (by changing the service ID), but because certain key IDs are replicated, systems may interpret the simulated order as a possible modification or augmentation to a past order (based on reuse of the value of the past order ID from the previously completed real order).

The order simulator of the VIES application may be implemented to simulate an order and a workflow in the network of the order management domain in order to test an order scenario. The VIES application may provide the ability to test a plurality of order scenarios. Each of the order scenarios may be associated with a template and stored in an order scenario repository, along with relevant event log data or other data parameters, and the templates may be utilized to simulate orders/workflows as needed to test order scenarios. The order simulator may receive a selection of an order scenario to be tested, such as the example order scenario S2. As described, testing a given order scenario may involve applying a template specific to the order scenario. Using a template specific to the order scenario, a simulated order may be generated and inputted to the network. In some embodiments, event log data associated with a real order may be applied to fields of the template to generate a simulated order, which can then be introduced to the network to test the order scenario. Returning to the previous example, event log data associated with the previously completed real order #7777 may be applied to the template T to generate a simulated order that may be used to test the order scenario S2. The order simulator may further activate and/or register the simulated order with the event orchestrator and initiate a first workflow step.

The event orchestrator of the VIES application may function as a proxy in an order management network for network traffic associated with orders. The event orchestrator may monitor network traffic associated with orders passing through the network and passing through the computing device where the VIES application is being implemented. The event orchestrator may further interact with, respond to, or retrieve certain network traffic associated with simulated orders that has simulated order identifiers. If simulated order identifiers are absent from certain network traffic, the event orchestrator may pass such network traffic on to its destination, or may simply disregard such traffic such that it is passed, or otherwise permitted to continue freely to its intended destination. Otherwise, if the event orchestrator identifies network traffic with simulated order identifiers, the event orchestrator may take action with respect to such network traffic. For example, certain network traffic associated with a simulated order as identified by the event orchestrator may request a response from the BPMS to complete a workflow for a simulated order. The event orchestrator may submit a response to the BPMS using event log data, or other predetermined values. The simulated order template builder, order simulator, and event orchestrator of the VIES application may comprise different modules, packages, or layers of the VIES application. However, the aforementioned need not be separate components and additional components and variations of the VIES application are contemplated.

FIG. 1 illustrates a system 100, which may be an order entry and management system. The system 100 may involve the VIES application and be implemented using one or more networks and computing devices. The system 100 may define at least an order entry domain 122 and an order management domain 124. The order entry domain 122 includes systems and devices for receiving orders from customers. The order management domain 124 includes systems and devices for processing orders received from the entry domain 122. Specifically, in the order management domain 124, workflows are generated to process orders received from the order entry domain 122 using, for example, one or more business process management systems, inventory systems, and the like. Once a workflow is created, other participants of the order management domain 124 or external systems may be assigned tasks defined by the workflow in order to fulfill specifications of the order and provide services according to an order scenario. As shown, the order entry domain 122 comprises a plurality of order entry systems represented by an order entry system1 (OE1) 102 and an order entry system2 (OE2) 104. The order entry domain 122 may include any number of order entry systems and is not limited to the two order entry modules as shown. The order entry systems comprise points of order entry in the order entry domain 122 and may be associated with one or more computing devices. For example, a customer, affiliate, or administrator of a service provider utilizing the system and networks of FIG. 1 may submit an order to the system 100 using OE1 102 or OE2 104 to request telecommunications services. The expectation is that the order will be fulfilled by the order management domain 124 such that telecommunications services will be provided to the customer as defined by the order. The order may be submitted to the system 100 at OE1 102 or OE2 104 and passed to the order management domain 124, which can initiate one or more workflows to extend services to the customer based upon the specifications of the order. Information about the order can traverse the system 100 in the form of network traffic and data packets using an Internet Protocol network, the Internet, or any such similar communication networks.

As further shown, the OE1 102 and OE2 104 may communicate bi-directionally with an enterprise service bus (ESB) 110. The ESB 110 of FIG. 1 may comprise a centralized communication hub, and may function as a broker and/or translator (and as a bridge between the order management domain 124 and the order entry domain 122) in order to route network traffic associated with orders from the order entry domain 122 (order entry network traffic) to the appropriate location in order management domain 124 of the system 100. Specifically, the ESB 110 may retrieve order entry network traffic from the order entry domain 122, translate data associated with order entry network traffic originating from either of the OE1 102 or the OE2 104 to a common platform understandable by elements of the order management domain 124 (a VIES application 112, and/or a business process management system (BPMS) 114), and route the order entry network traffic to its intended destination in the order management domain 124. In other words, the ESB 110 may act as an intermediary between the order entry domain 122 and the order management domain 124 and enable different order entry systems and associated applications of the order entry domain 122 to send data back and forth and otherwise communicate with devices of the order management domain 124 having access to the ESB 110. The ESB 110 may replace direct contact between applications associated with OE1 102 and OE2 104 and elements of the order management domain 124, so that such communications may instead occur through the ESB 110. The ESB 110 may employ a common communication protocol for communications between the order entry domain 122 and the order management domain 124 (which may include a web service communication protocol such as Extensible Markup Language (XML)). A common messaging format may be implemented (such as Java). In addition, at least one adapter may assist to transform or convert communications and/or order entry network traffic from the order entry domain 122 to the common messaging format and to integrate order traffic to a unified platform. For example, a message associated with an order that is transmitted from the OE1 102 to the ESB 110, may be converted from a Simple Object Access Protocol (SOAP) format over HyperText Transfer Protocol (HTTP) protocol to the SOAP format over Message Queue (MQ) protocol in order for the order information associated with the message to be understood and received by elements of the order management domain 124. Such an adapter may be analogous to a physical network adapter, and may utilize XML and Extensible Stylesheet Language Transformations (XSLT). In one embodiment, the ESB 110 and/or the VIES application 112 may be implemented using J2EE and/or .NET. In one embodiment, the ESB 110 converts order data from the OE1 102 and the OE2 104 to enterprise data objects understandable by or otherwise compatible with the BPMS 114 and other systems of the order management domain 124.

FIG. 1 further shows the BPMS 114. The BPMS 114 may be implemented using one or more computing devices, servers, or the like. The BPMS 114 may be operable to manage and create workflows based upon orders and order traffic received from the ESB 110 and the order entry domain 122 and by communicating with other systems of the order management domain 124. More specifically, the BPMS 114 may create a workflow and assign individual tasks for completing an order to different computing devices and locations and automate and manage tracking of the workflows. The BPMS 114 may also comprise a user interface 115 to view a status of a particular workflow. The BPMS 114 may comprise any combination of modeling, automation, execution, control, measurement, and optimization of business activity flows, in support of enterprise goals, spanning systems, employees, customers, and partners within and beyond the network boundaries of an enterprise telecommunications service provider. The BPMS 114 may comprise software for the set-up, performance, and monitoring of a defined sequence of tasks arranged as a workflow, based upon order information from the order entry domain 122. As one example, an order may ingress into networks of the system 100 at the OE1 102. The ESB 110 may normalize or convert data associated with the order to a predefined format, and transmit the order as order entry network traffic to the BPMS 114. The order may cause a particular workflow to be initiated by the BPMS 114 or other systems of the order management domain 124. In other words, a certain workflow may be required based on the particulars of the order that identifies a number of processes and sub-processes or tasks that need to complete in order to complete the order (and provision services/products to the customer). For example, an order may include a request for a plurality of Voice over Internet Protocol (VoIP) connections at a customer site, and to complete the order and provision the VoIP connections, the BPMS 114 may initiate a workflow comprising tasks of deploying VoIP devices for the customer, configuring VoIP connections, and the like. Upon receiving the order, the BPMS 114 may create and monitor one or more workflows (represented as a workflows module 118) to complete tasks needed to provision the services/products of the order for the customer. As further shown in FIG. 1, the BPMS 114 may communicate with other systems such as an inventory system 116 in order to create and process workflows. The inventory system 116 may store or otherwise have access to information about inventory of network devices that may be provisioned, configured, or otherwise implemented to extend telecommunications services to customers. The BPMS 114 may query the inventory system 116 or assign a task to the inventory system 116 to produce information about inventory status as part of processing a workflow. In either case, the BPMS 114 is generally operative to create and monitor workflows to provision orders and associated services.

The VIES application 112 of FIG. 1 may be implemented using one or more computing devices, routers, or switches, such as the computing device 106. The VIES application 112 may comprise the simulated order template builder, the order simulator, and the event orchestrator layers explained in greater detail below. The computing device 106, implementing the VIES application 112, may be coupled in a network associated with the system 100 between the ESB 110 and the BPMS 114. Consequently, the system 100 may be configured such that the computing device 106 is a part of the flow path for order entry network traffic normalized at the ESB 110. In other words, the order entry network traffic ingresses into the order entry domain 122, and flows through the computing device 106 to the BPMS 114. Similarly, the BPMS 114 or other systems of the order management domain 124 may issue network traffic associated with orders that flows to the ESB 110 (with the intended destination being the order entry domain 122) by first passing through the VIES application 112. As such, in one embodiment, all network traffic associated with orders, including network traffic associated with both simulated and real orders, may pass through or be directed to the computing device 106 implementing the VIES application 112. The VIES application 112 may either act upon such network traffic or permit the network traffic to continue on to other systems. As explained below, the VIES application 112 may interact with certain network traffic associated with simulated orders to simulate a workflow and test an order scenario in the order management domain 124.

FIG. 1 further shows an event logs database 108, which may be stored on one or more storage and/or computing devices. The event logs database 108 may be coupled to or otherwise accessible to the ESB 110 and the VIES application 112. The ESB 110, as a communication hub between the order entry domain 122 and the order management domain 124, may track a voluminous amount of information about orders as network traffic associated with orders passes through the ESB 110. More specifically, to provision an order in the system 100, the order may enter the system 100 in the order entry domain 122, and be communicated to the order management domain 124 using the ESB 110. As described, an order may be associated with a particular order scenario. For example, an order #1234 may request a virtual private network VPN connection; such that it may be said the order #1234 defines an order scenario for provisioning a VPN. To address the given scenario and respond to the customer and for the order #1234 to be completed such that the VPN may be provisioned for a customer, a workflow may be initiated by the BPMS 114. The workflow may comprise a plurality of tasks, and sub-processes or tasks that need to be completed so that the VPN can be provisioned for the customer.

As the workflow progresses through the system 100, or as tasks of the workflow are completed or addressed, communications may be issued back and forth between the order entry domain 122 and the order management domain 124 to advance the workflow and address tasks of the workflow. For example, one communication may be an alert about new order traffic when a corresponding new order ingresses into the order entry domain 122, and is passed to the BPMS 114 in the order management domain 124. The communication may create an event log file, or a portion of an event log file. Similarly, another communication may be issued from the order management domain 124 back to an order entry system, such as the OE1 102 of the order entry domain 122. The BPMS 114 may request additional information from the customer who inputted the order at the OE1 102. Any of such communications may be captured, logged, tracked, and/or organized using event logs, may be associated with event log files, and may be stored in the event logs database 108 as event log data. An event log may contain sufficient detail to reproduce an order that has been processed through the system 100 and completed.

The VIES application 112 is an active participant in the system that facilitates the testing of order scenarios. In one embodiment, the VIES application 112 can plug into the ESB 110 and retrieve information about network traffic associated with orders based on order IDs that have been used for real orders. The VIES application 112 reduces the need to create a simulated order upstream in the order entry domain 122 which saves time and effort in testing order scenarios. The VIES application 112 may further be in communication with an order scenario repository 120, which may be implemented using one or more storage devices coupled to or otherwise accessible to the computing device 106 implementing the VIES application 112. As referenced below, the order scenario repository 120 may store order scenarios in the form of templates. As described, the order scenarios may be a type of order and/or request for services from a customer and may be associated with one or more workflows that may need to be completed to provide services to the customer according to specifications of the order scenario. For example, one order scenario may define a type of order that involves provisioning a plurality of customer premise devices (CPEs). The VIES application 112 may be able to extract event log data from the event logs database 108 for a previously completed order that is related to or substantially defines that order scenario. In other words, the VIES application 112 may extract event log data for a previously completed order that involved the order scenario of provisioning a plurality of CPEs for a customer. The VIES application 112 may then build a template to subsequently test that order scenario, using the event log data of the previously completed order. Information about such an order scenario may be stored in the scenario repository 120.

The VIES application 112 reduces the need to create an order in the order entry domain 122 upstream which saves time, effort, and may reduce errors during order simulation. The VIES application 112 simulates orders as requested and may integrate events, tasks or other aspects of a workflow triggered by the commencement of a simulated order. The simulated order template builder and order simulator of the VIES application 112 may be customizable as needed, providing greater flexibility for order simulation. With the VIES application 112, there may be little to no interruption to traffic associated with real orders originating from the order entry domain 122.

Figure 2:
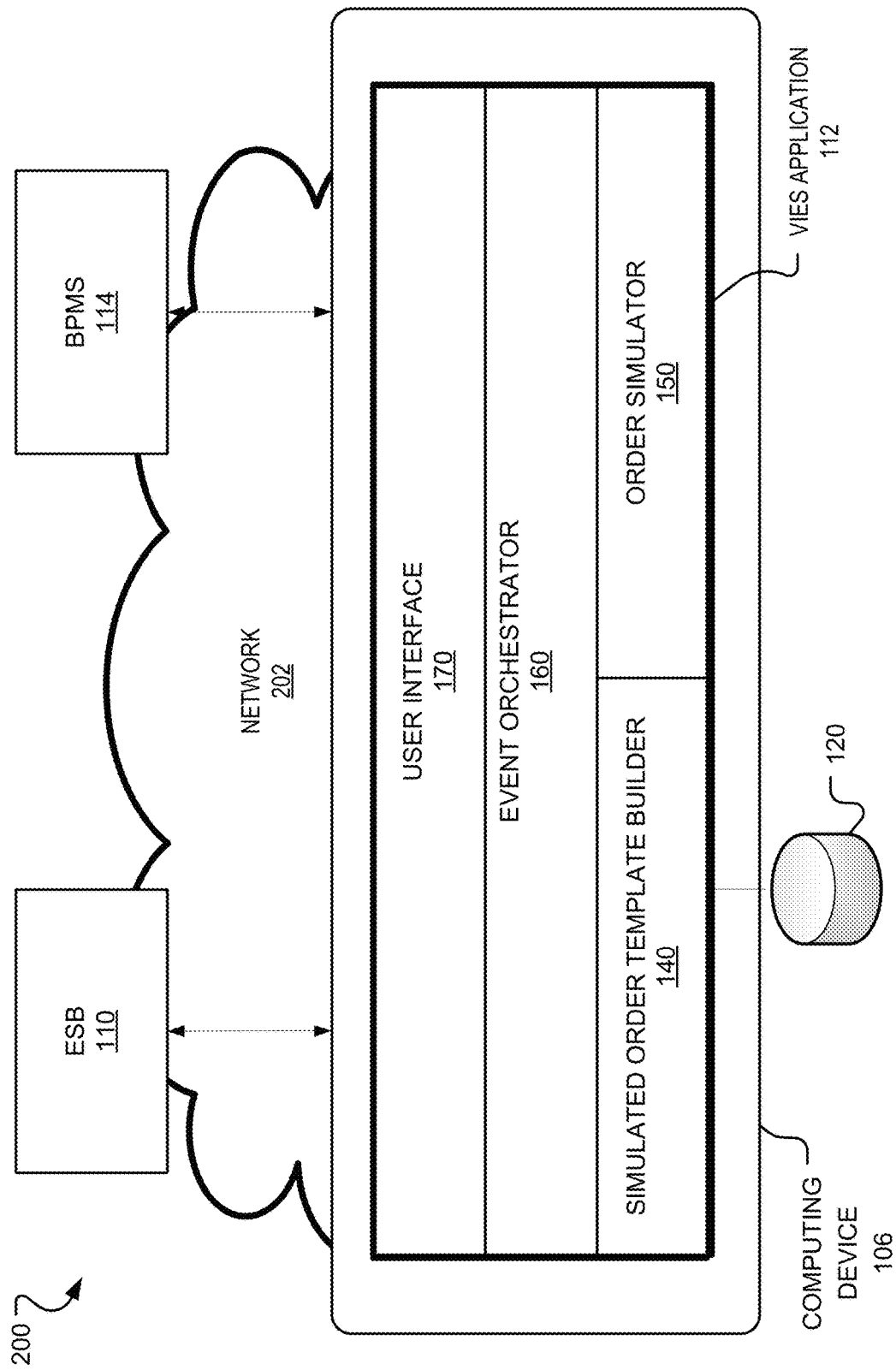
FIG. 2 illustrates a view of a computing device implementing the VIES application including exemplary layers of the application for interacting with the network, according to aspects of the present disclosure.

FIG. 2 illustrates further detail about a possible configuration 200 for the system 100. As shown, the computing device 106 (implementing the VIES application 112) may be particularly positioned in a network 202 of the order management domain 124, such that the computing device 106 is positioned in the flow path for network traffic associated with orders that is being routed from the ESB 110 to the BPMS 114 and for network traffic associated with orders flowing from the BPMS 114 to the ESB 110. As such, the computing device 106 and the VIES application 112 may be conveniently positioned to gather information about network traffic associated with orders from the network 202, analyze such information, and proxy certain network traffic for simulated orders.

In addition, FIG. 2 illustrates a more detailed view of the computing device 106 implementing the VIES application 112 and shows exemplary layers of the application for interacting with the network, according to aspects of the present disclosure. Specifically, as shown, the VIES application 112 may comprise a simulated order template builder 140, an order simulator 150, an event orchestrator 160, and a user interface 170.

Figure 3:
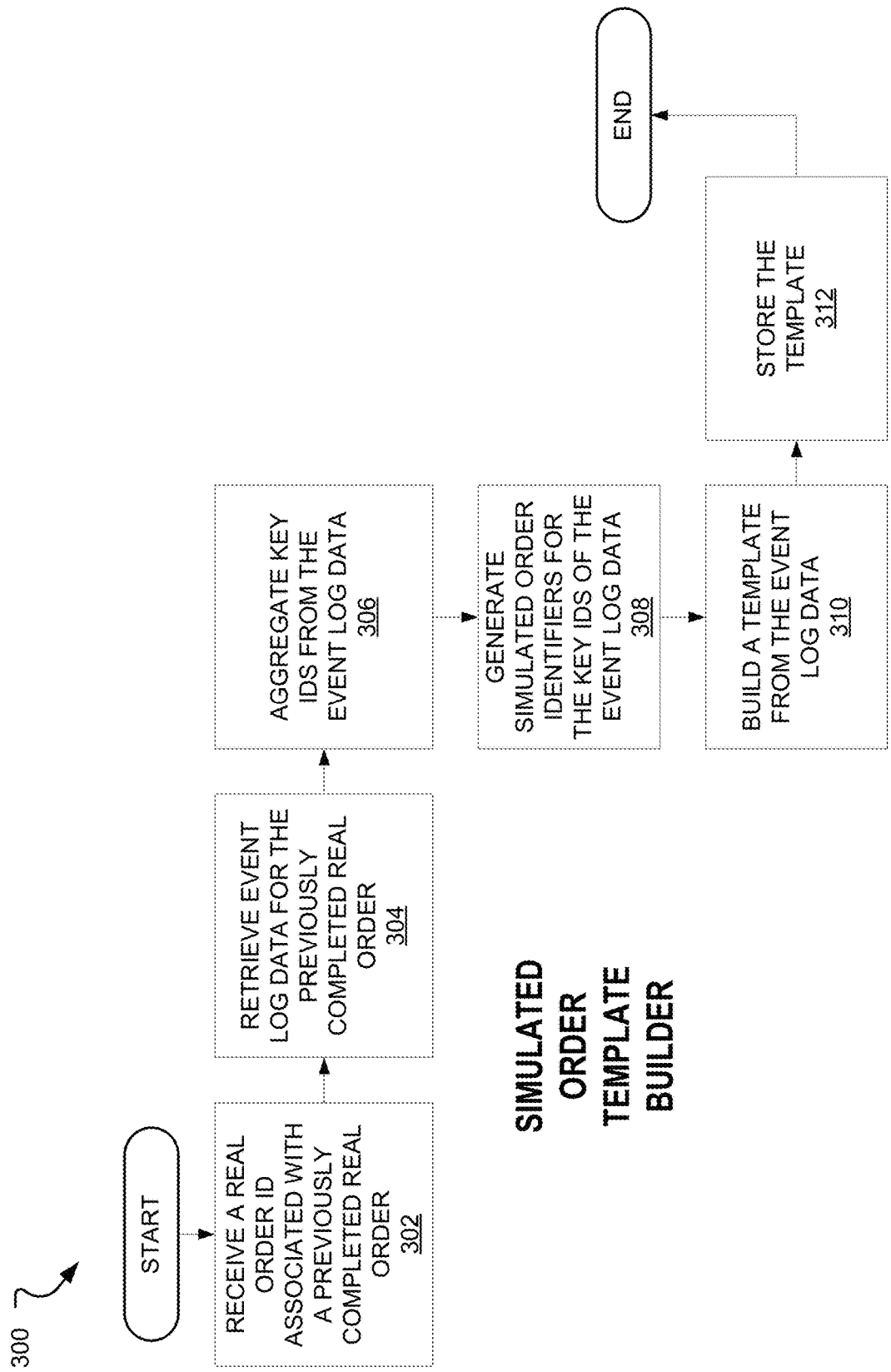
FIG. 3 illustrates an exemplary process flow for building a template to simulate an order and workflow and test an order scenario, according to aspects of the present disclosure.

The simulated order template builder 140 may comprise functionality of the VIES application 112 to build one or more templates for a particular order scenario, or order type. Returning to the example above, one order scenario may involve the provisioning of a plurality of CPE devices for a customer. Another order scenario may involve the provisioning of a VPN for a customer. One or more workflows may need to be processed and completed in order to complete or recreate such order scenarios. Aspects of the simulated order template builder 140 are shown by the process 300 of FIG. 3. In block 302, a real order ID may be submitted to and received by the simulated order template builder 140. The real order ID may be received at the user interface 170 of the VIES application 112. The real order ID may identify a previously completed real order that involves a particular order scenario X, where it is desired to test the order scenario X or store information about the order scenario X in the order scenario repository 120. To illustrate, the real order ID received may be #1234, and the order #1234 may call for a plurality of CPE devices to be provisioned for a customer. In other words, the order #1234 may comprise an order scenario that involves the provisioning of the plurality of CPE devices. The simulated order template builder 140 may utilize information about the order with order ID #1234, where it is desired to build a template and store information about the order scenario X of provisioning the plurality of CPE devices. The BPMS 114 may be operable to setup, monitor, and manage a workflow for tasks to complete an order involving such an order scenario. In other embodiments, one or more tasks may involve participants external to the system 100, as in the case where a workflow involves configuring a desktop computer.

In one embodiment, each of a plurality of order scenarios may define one or more workflows. In other words, to recreate a scenario, tasks associated with the one or more workflows may need to be completed and/or addressed. Referencing the above example, a workflow for the order scenario of provisioning a plurality of CPE devices may involve tasks such as configuring the CPE devices, validating model information of the CPE devices, setting up connections for the CPE devices, such as trunks, and the like.

In block 304, the simulated order template builder 140 may retrieve or otherwise access related event logs and event log data for the order associated with the order ID #1234 from the event logs database 108. The event log data may include information about bidirectional order traffic in the system 100 including all the steps that transpired in order to fulfill the order #1234. Specifically, the event log data may include requests for further information about the order #1234 and a response from an order entry system such as OE1 102, information about any failures or issues experienced during the provisioning of the order, whether inventory information needed to be retrieved from the inventory system 116, and the like. Importantly, by retrieving such information, the simulated order template builder 140 acquires information as if it were an order entry system with important details about the back and forth communications between the order entry domain 122 and the order management domain 124 as the workflow was processed to complete an order (such as order #1234). The real order ID (#1234) is associated with an actual historical completed order that has been entered into the order entry domain 122 and completed through the order management domain 124 such that the real order has been fulfilled and all tasks associated with the order have been completed. For example, the real order ID #1234 may be associated with an order for installation of VoIP connections and VoIP phones which may include various tasks such as setting up a VoIP network and/or installing the VoIP phones. In one embodiment, event logs include some or all of the transactions that pass through the ESB 110 for the order associated with the real order ID #1234. A task may include, e.g., circuit design preparation. Event logs may further reflect issues with particular orders such as information that a particular order resulted in twenty technical support calls to configure devices. Event logs may further include sequential call traffic for the particular order. Event logs include any information and details that would be useful for optimizing or testing an order scenario X and associated workflows based on information derived from a historical order with a similar order scenario.

In block 306, the simulated order template builder 140 may identify and aggregate a plurality of key IDs across event logs and associated event log data for the real order. In some embodiments, a key order ID associated with an order may be an ID that can only be used once or a limited number of times. Once an order is processed in the system 100 using such key IDs for the order, certain key IDs may become known previously used key IDs, and may not be re-used without causing errors or failure during order processing. The simulated order template builder 140 may scan the event log data for and correlate related such key IDs unique to the order for modification. To recreate, or simulate a new order using information similar to the real order previously processed, but avoid complications or errors of using a known previously used ID, the simulated order template builder 140 may tokenize or otherwise modify input parameters associated such key IDs. Specifically, the input parameters for such key IDs may be supplemented with information that distinguishes the key IDs from the previous order, e.g., simulated order identifiers. Such simulated order identifiers may alert the VIES application 112 (or other elements of the order management domain 124), regarding the presence of a simulated order. In some embodiments, the values of the key IDs may be modified to identify that a simulated order is testing a modification or augmentation to a previously completed order.

In block 310, using event log data of the order associated with the order ID #1234, a template may be created. The template may comprise an XML document with a query string and stored procedures to be executed in order to generate a simulated order to test the order scenario X. Specifically, the template may define a flow of communication between the BPMS 114 and the VIES application 112 (based on aspects of a previously completed order). As shown in block 312, templates for certain scenarios may be stored in the scenario repository 120. When it is desired to test an order scenario, a template associated with the order scenario may be retrieved from the scenario repository 120. In one embodiment, when an order scenario requires alteration, or adjustment, a template associated with the order scenario can be modified to address, e.g., new components of a workflow for the order scenario. For example, if a task A is added to a workflow that is normally utilized to address a given order scenario, a template associated with the given order scenario can be modified to receive or otherwise access event log information associated with the task A which may include a new type of event log information. Accordingly, the simulated order template builder 140 utilizes information about previously completed orders to build templates that can be customized with predefined values specific to certain scenarios for order scenarios. The templates may be used to test the order scenarios in the order management domain 124, and the templates may be stored in a database.

Figure 4:
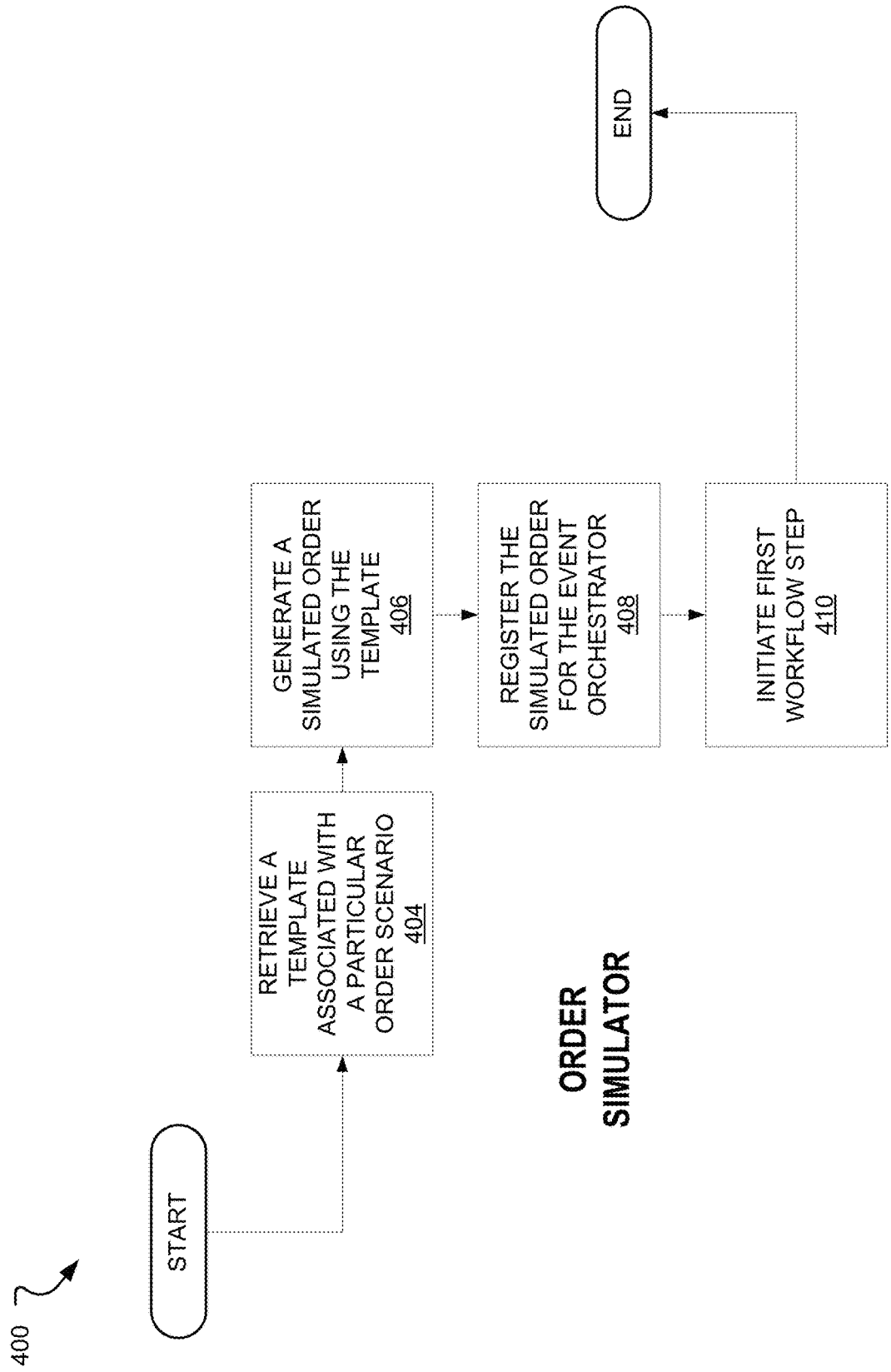
FIG. 4 illustrates an exemplary process flow for simulating an order to initiate a simulated workflow and test an order scenario, according to aspects of the present disclosure.

FIG. 4 illustrates a process 400 for implementing the order simulator 150. An order scenario may be selected from the scenario repository 120. In block 404, the selected order scenario may be retrieved from the scenario repository 120 for use by the order simulator 150. Specifically, a template associated with the order scenario may be retrieved, in addition to event log data used to make the template and any other information specific to the order scenario. For example, in some embodiments, a template of an order scenario may be configured, by modifying fields/input parameters of the template, to omit certain aspects of an order that may not be necessary to simulate the order and simulate an associated workflow.

As shown in block 406, the order simulator 150 may then generate a simulated order from the template that can be used to test the order scenario. Specifically, event log data associated with a previously completed real order used to create the template for the order scenario may be applied, or fed to the template to generate a simulated order. By using simulated order identifiers with the certain key IDs, the simulated order may look and feel like the previously completed real order upon which it is based, but may be distinguishable in the system 100, and identifiable in the system 100 because of the simulated order identifiers. In particular, the VIES application 112 (and other elements of the order management domain 124) may use the simulated order identifiers to identify the simulated order in the network 202. The simulated order may be transmitted through the network 202 or otherwise made available to the BPMS 114.

The BPMS may initiate a simulated workflow to complete the simulated order including a plurality of tasks that would need to be completed for a real order. With a simulated order, at least some tasks may be simulated or virtualized. In other words, once a simulated order is created using a template, the simulated order may be fed into or otherwise inputted to the order management domain 124 of the system 100 at the VIES application 112 and computing device 106; similar to the way a real order would ingress into the order management domain 124. However, the VIES application may retrieve communications from the BPMS or other systems, based on the simulated workflow, such that no real action is taken with respect to certain tasks of a simulated workflow. In one embodiment, the VIES application may communicate with the BPMS 114, via the user interface 115, to setup, monitor, and manage a simulated workflow associated with the simulated order. A simulated workflow can be retrieved and displayed graphically to illustrate the progress of the simulated workflow as if the tasks were actually being handled and addressed. Specifically, the tasks associated with a simulated workflow scenario can be displayed graphically to the user to indicate what may occur if the simulated order were a real order associated with the order scenario. In some embodiments, one or more of the tasks of the simulated workflow may be optional.

Explained another way, upon receiving the simulated order and based upon parameters and specifications of the simulated order, the BPMS may create a workflow, just as it would for a real order. Like a workflow for a real order, a simulated workflow for the simulated order may be created with a list and order of tasks that may be completed to process the workflow and complete the simulated order. As part of completing a task and managing task delegation, the BPMS 114 may submit communications or requests to other elements of the system 100. For example, the BPMS 114 may assign a task to the inventory system 116 to remove certain CPE devices from an inventory list to provision the order. The BPMS 114 may issue/assign a task to a technician associated with the system to configure one or more computing devices to provision the order. The BPMS may further request additional information or assign tasks to the order entry domain 122. In one embodiment, the steps of assigning tasks, and completing one or more tasks of a simulated workflow may be virtualized. In other words, the VIES application may retrieve communications from the BPMS 114, regarding tasks or aspects of a simulated workflow, before the communications reach actual systems of the order management domain 124. The VIES application may utilize event log data or other predefined information to respond to the BPMS 114. As such, while the BPMS 114 may mange and organize the simulated workflow as it would for a workflow for a real order, certain tasks of the simulated workflow may not be actually carried out by other systems because the VIES application may monitor and retrieve communications from the BPMS to other systems, such as the inventory system 116, for certain tasks of the simulated workflow.

The order simulator 150 may register the simulated order with the event orchestrator 160. In other words information about the simulated order and the associated order scenario may be sent to the event orchestrator 160 so that the event orchestrator 160 can monitor network traffic associated with orders flowing through the network 202, and otherwise proxy traffic specific to the simulated order. As further shown, the order simulator 150 may initiate a first workflow step or task. In other words, the order simulator 150 may prompt the BPMS 114 to create a workflow for the simulated order.

In sum, the order simulator 150 enables the retrieval of an order scenario and an associated template from a scenario repository 120, the order simulator 150 may build a simulated order for the order scenario by applying event log data to the template while using simulated order identifiers, the order simulator 150 may register the simulated order with the event orchestrator 160, and a first workflow step or the scenario may be initiated.

Figure 5:
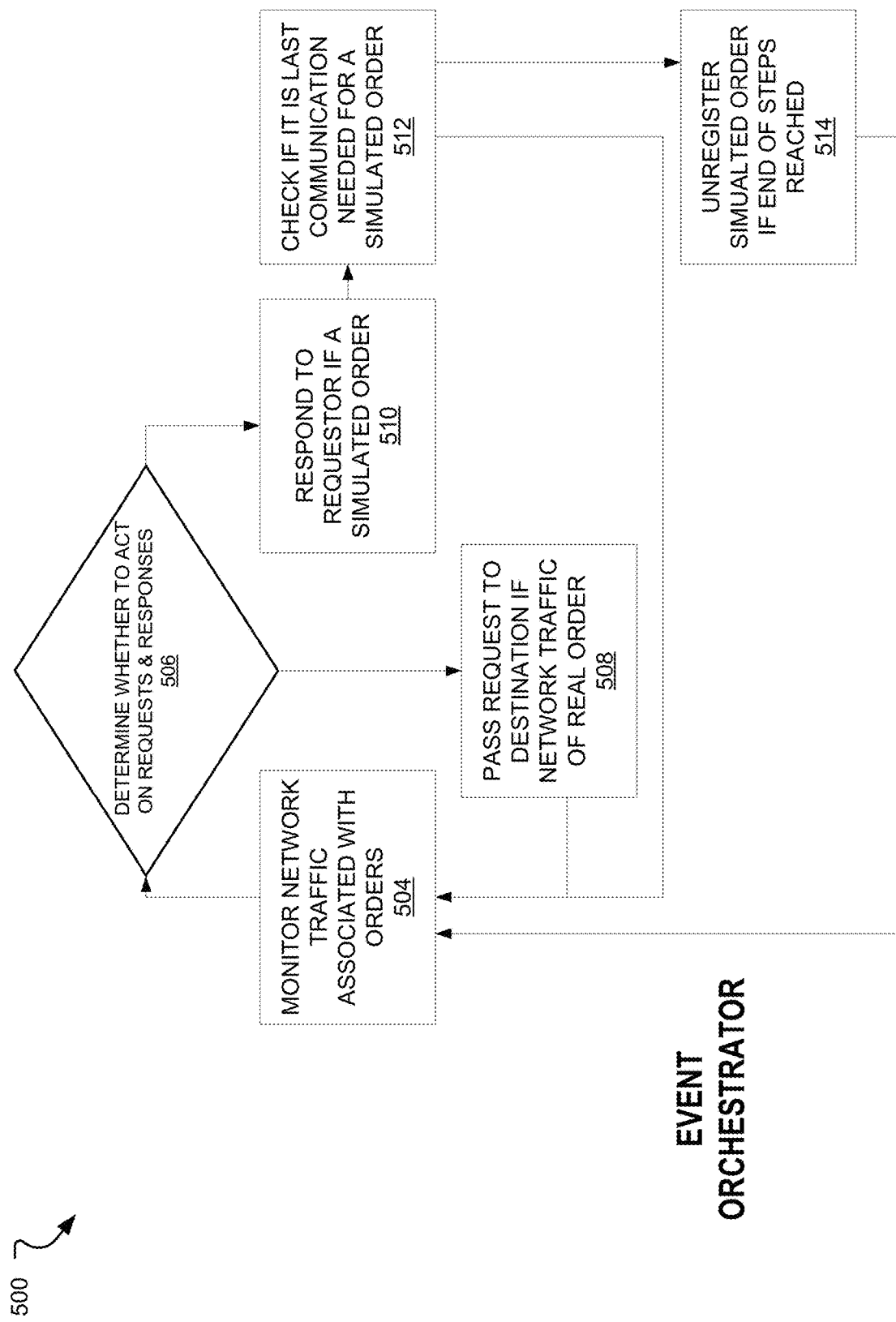
FIG. 5 illustrates an exemplary process flow for implementing an event orchestrator to simulate a workflow in order to test an order scenario utilizing the virtual integration event simulator application, according to aspects of the present disclosure.

FIG. 5 illustrates a process 500 for implementing the event orchestrator 160 of the VIES application 112. The event orchestrator 160 may be initiated, which may be triggered by the order simulator 150 as shown in FIG. 4. As shown in FIG. 2, the computing device 106 sits in the order traffic flow path between the ESB 110 and the BPMS 114, such that the event orchestrator 160 is in a position where network traffic associated with orders is inherently presented to the event orchestrator 160 in the system 100 due to the network flow path of the order management domain 124. As previously described, once a simulated order has been submitted to the order management domain 124, certain order traffic associated with the simulated order may be arrive at the computing device 106 from the BPMS 114 or other systems and participants of the order management domain 124. For example, the BPMS 114 may, in response to receiving a simulated order, issue a request for additional information, or transmit an update regarding a workflow (virtual or otherwise simulated) that the BPMS 114 has built or is otherwise processing to report back information about the simulated order. Other participants in the order management domain 124 may further issue order traffic associated with the simulated order. For example, in some embodiments a system may be queried or prompted to provide information about availability and ability to complete a task for the simulated order by the BPMS 114 (such as the inventory system 116), and may transmit information about the task across the network 202. Using event log files, the VIES application can communicate with the BPMS 114 on behalf of other systems of the order management domain 124 to process simulated workflows without tasks actually being communicated to certain systems normally assigned to handle certain tasks of a workflow. The participants of the order management domain 124, such as the BPMS 114, may typically pass such order traffic towards a destination of the order entry domain 122. In other words, with a real order, the BPMS 114 may typically issue an order communication to an OE1 102, through the ESB 110. However, because of the position of the computing device 106 in the network 202, such an order communication may pass through and/or otherwise arrive at the computing device 106 (and may be intercepted) before being sent to the ESB 110.

In block 504, the event orchestrator, as an active component of the system 100, may listen to, monitor, and otherwise analyze order traffic that arrives at the computing device 106 implementing the VIES application. In one embodiment, the event orchestrator 160 may comprise a packet analyzer, protocol analyzer, packet sniffer, Ethernet sniffer, or wireless sniffer. Using such technology, the event orchestrator 160 may specifically listen to order traffic at the computing device 106 for traffic that has simulation order identifiers that may indicate that such traffic is associated with a simulated order. In some embodiments, as data streams flow across the network 202, the event orchestrator 160 employs a sniffer that captures certain network packets and the event orchestrator 160, if needed, decodes the packet's raw data, showing the values of various fields in the packet. The event orchestrator 160 may further analyze the packet's content to determine whether the fields contain one or more of the simulated order identifiers and whether it indicates a request or a response.

In other embodiments, all data packets for network traffic associated with orders passing through or otherwise arriving at the computing device 106 may be monitored using a network switch with a monitoring port, or network tap. Using a monitoring port of a switch, all packets that pass through ports of the switch may be monitored when systems, such as the ESB 110 and the BPMS 114, are connected to a switch port. In a wireless embodiment of network 202, order traffic may be captured by the event orchestrator 160 using one or more adapters. In some embodiments, the event orchestrator 160 may be limited to analyzing headers of packets associated with network traffic (and not specifics of packet contents) to avoid viewing or recording the packet's contents in cases where the packet is associated with a real order and which may be sensitive information.

The event orchestrator 160 may intercept or otherwise analyze network traffic at the computing device 106, and analyze headers (or contents) of packets associated with such order traffic to search for simulated order identifiers, tokenized fields, or certain input parameters. As shown in block 506, the event orchestrator 160 may be presented a decision whether to intercept certain order traffic or to pass the order traffic along to the ESB 110 and whether to issue a response or a request. Where the event orchestrator 160 identifies certain simulated order identifiers in a data packet, the event orchestrator may flag, intercept, or otherwise take action with respect to the data packet because the data packet may be associated with a simulated order (as indicated by the simulated order identifiers). If the event orchestrator determines the packet is associated with a simulated order, the event orchestrator 160 may examine responses or requests as defined by information from the packet. Specifically, if the event orchestrator determines that a packet is associated with a simulated order (simulated order packet), the event orchestrator may extract data from the simulated order packet or view the contents of the simulated order packet to determine whether the simulated order packet defines a request for information, an alert, a response with information, or the like.

On the other hand, for each data packet of network traffic associated with orders, if the event orchestrator determines the packet is associated with a real order (and does not contain simulated order identifiers or is not otherwise associated with a simulated order), the computing device 106 may simply release, disregard, or otherwise pass the packet or route the packet to the ESB 110 so that the packet can continue on to its destination, which is typically the order entry domain 122. In other words, as shown in block 508, the event orchestrator 160 may pass a request or other real order traffic to its destination in the order entry domain 122 if it is associated with a real order. As such, the event orchestrator 160 and computing device 106 may be analogous to a filter or proxy for order traffic.

Block 510 of FIG. 5 illustrates an initial step where the event orchestrator has examined network traffic and identified that the network traffic is associated with a simulated order. The event orchestrator may respond to a requestor of information or otherwise take action in response to such network traffic received that is associated with a simulated order. The event orchestrator 160 may further pass network traffic along within the network 202. In one embodiment, the event orchestrator 160 may take any such action necessary to process the simulated workflow associated with the simulated order. For example, the event orchestrator 160 may query the inventory system 116, follow up regarding tasks assigned to participants or elements of the order management domain 124, provide additional simulated order information from event log data, provide predetermined responses based on event log data or other predetermined information, or the like. In one embodiment, certain predefined data may be assigned to a simulated order. As such, where a request associated with the simulated order is intercepted by the event orchestrator 160, the event orchestrator 160 may submit the predefined data to the requestor of the request. In some embodiments, the event orchestrator 160 is operable to intercept any network traffic associated with a simulated order instead of the traffic being directed to the order entry domain 122. In one embodiment, the event orchestrator 160 may respond to requests for information in the form of network traffic by utilizing previous responses of event log data, from which the simulated order is modeled and created. In one embodiment, the event orchestrator 160 may further access aspects of the BPMS 114 by connecting to a user interface 115 of the BPMS 114. The event orchestrator 160 may connect to the user interface 115 of the BPMS 114 using an application programming interface (API), or by otherwise making the user interface 115 available to the VIES application 112.

In block 512, the event orchestrator 160 may check to see whether a request or other communication associated with a data packet of network traffic in the order management domain 124 is this last response, or task that needs to be completed to fulfill or provision the simulated order. The event orchestrator 160 may have access to information about the workflow of the simulated order or may access such information from the BPMS 114. The steps of block 512 may help to identify a stage or task towards the end of the workflow at which to alert a component of the system 100, or otherwise terminate a simulated order in order to avoid actual services/devices being provisioned based upon specifications of the simulated order. It should be understood that at block 512 the simulated workflow may have successfully completed such that the order scenario associated with the simulated order and workflow has been tested successfully. In block 514, the simulated order may be unregistered or otherwise removed from the system 100 where the event orchestrator 160 is directed to halt monitoring and testing of a workflow for the simulated order. Unregistering and/or otherwise removing the simulated order may prevent actual services/devices being provisioned based upon specifications of the simulated order.

In sum, the event orchestrator 160 listens to request traffic, examines requests and responses against registered simulated orders, and passes a request to a destination if the request is associated with a real order. The event orchestrator 160 may further repeat the steps in block 504 to block 508 and respond to a requester if the request is associated with a simulated order. The event orchestrator may further check to see if a response is the last response needed to complete a simulated order, and if so, unregister the simulated order from the system 100. In some embodiments, the event orchestrator 160 may further comprise a task completion mechanism which automates task completion and may reduce the need for the event orchestrator 160 to prompt a user to show that the user has completed a task. For example, the task completion mechanism of the event orchestrator 160 may be programmed with sufficient logic such that the event orchestrator 160 can automatically respond to requests for information from the BPMS 114 based upon event log data or by communicating with the BPMS 114 through a user interface 115 associated with the same.

Figure 6:
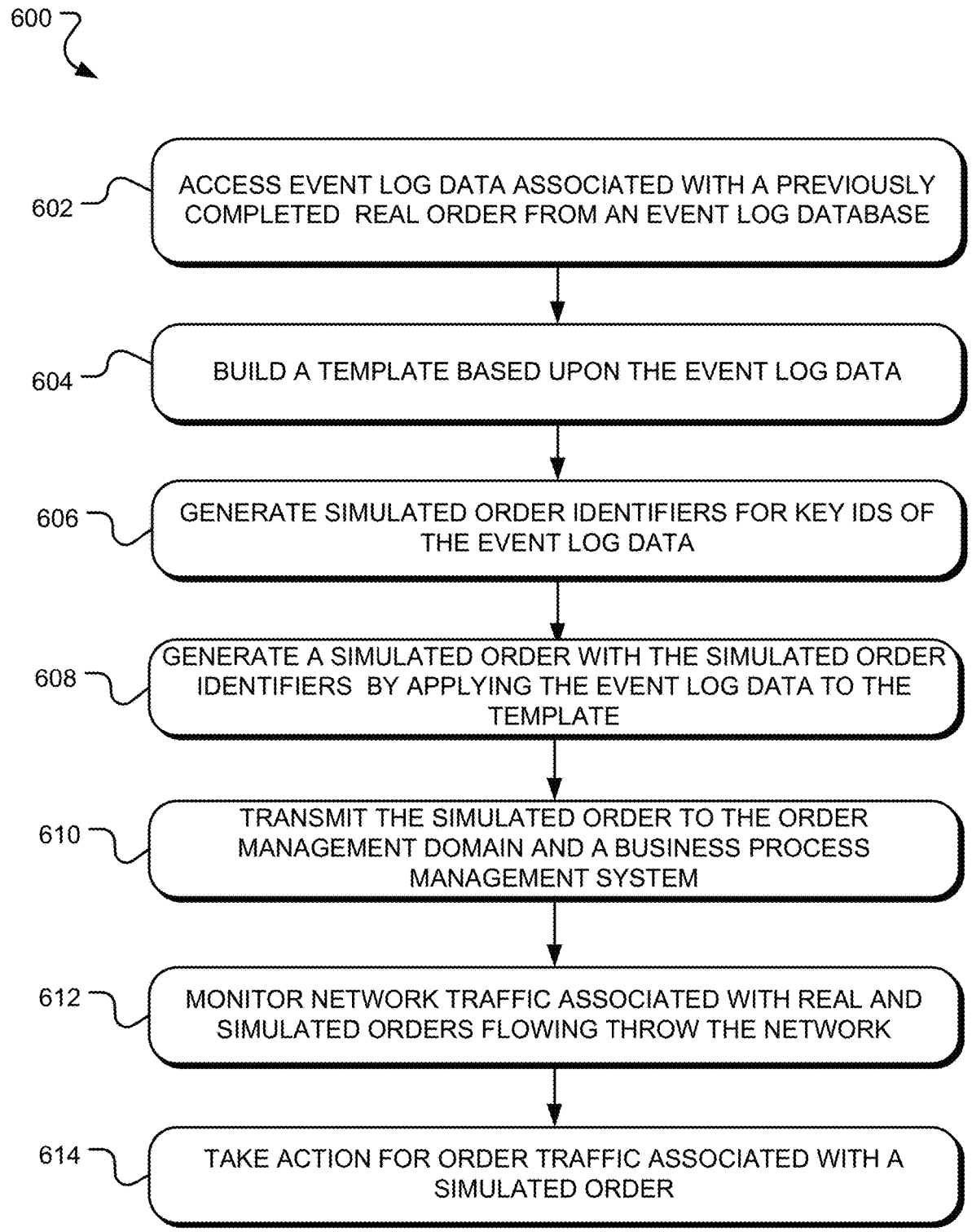
FIG. 6 is an exemplary process flow for simulating orders and workflows to test order scenarios, according to aspects of the present disclosure.

A combined process flow 600, showing interaction between the different layers of the VIES application 112 is provided by FIG. 6. In order for the process flow 600 to be implemented, the VIES application may be installed to or otherwise be accessible from a computing device 106. The computing device 106 may reside in the network 202 between the ESB 110 and the other elements of the order management domain 124, such as the BPMS 114, as part of the flow path for network traffic associated with orders. In block 602, the VIES application 112 may retrieve event log data associated with a historical, past, or previously completed real order that has completed within the system 100. It may be desired to test an order scenario (which shares attributes with the previously completed real order) to determine if the scenario can be successfully provisioned for a customer. To test an order scenario, event log data may be retrieved (using a real order ID) about a past order that defines, shares attributes with, or otherwise encompasses the order scenario. For example, a real order ABC, previously completed, may share attributes with an order scenario, in that both the order scenario and the real order ABC call for a VPN to be provisioned for a customer. It may be desired to simulate an order and workflow to test that order scenario—provisioning a VPN for a customer. As such, event log data related to the real order ABC may be retrieved from an event log database 108. The event log database 108 may contain detailed information about bidirectional order traffic that has flowed through the ESB 110 for the real order ABC, which may be relevant and useful for testing the order scenario.

In block 604, a template may be generated from the event log data associated with the real order ABC. The template may comprise XML, JavaScript Object Notation (JSON), a human-readable data serialization language incorporating aspects of C, Perl, and Python, such as YAML, or the like and may contain fields, a query string, and stored procedures to be executed. The template may be used to generate a simulated order which (with help from the BPMS 114) can initiate a workflow (which may be simulated or virtualized) to essentially recreate the given order scenario of provisioning a VPN for a customer. At block 606, key IDs of the event log data associated with the real order ABC may be identified, and correlated or otherwise aggregated from the event log data. The key IDs may represent values that cannot be re-submitted to the system 100 for whatever reason and may be unique to the real order ABC such that submitting a simulated order with the key ID values of the real order ABC may cause errors or failures within the system 100. Accordingly, values for the key IDs of the event log data associated with the real order ABC may be modified or supplemented with simulated order identifiers. In other words, the template may be configured to modify or tokenize input parameters/values associated with key IDs of the event log data. The tokenized input parameters of the key IDs for the order may further be used by the VIES application 112 to distinguish simulated order traffic from real order traffic.

In blocks 608 and 610, the VIES application 112 may generate a simulated order based upon the order scenario (which shares attributes with the real order ABC) by applying the event log data of the real order ABC to the template; and the VIES application 112 may then submit or release the simulated order to the order management domain 124, which may be retrieved by the BPMS 114. Similar to interaction with a real order, the BPMS 114 may retrieve the simulated order and create a workflow for the simulated order based on the parameters and specifications of the simulated order. Further, while assigning tasks, and otherwise monitoring and managing the workflow, the BPMS 114 may issue certain order traffic associated with the simulated order through the network 202. Specifically, the BPMS 114 may attempt to request additional information from the order entry domain 122 about the simulated order or attempt to send an update to the order entry domain 122; all in the form of order traffic, at least some of which may be intercepted and responded to by the VIES application 112.

In block 612, the VIES application monitors or filters order traffic passing through or otherwise routed to the computing device 106 to look for network traffic associated with simulated orders. The VIES application may identify the simulated order identifiers of the simulated order by intercepting data packets associated with order traffic, and viewing the contents of each data packet. Alternatively, the template may be configured to produce a simulated order with tokenized header information, such that data packets associated with simulated order traffic may be identified by the headers of such order traffic.

In block 614, the VIES application 112 may take action with respect to simulated order traffic received or otherwise identified in block 612. For example, the VIES application 112 may respond to a requestor of information in the order management domain 124 using, e.g., event log data or predetermined responses developed when creating the template. Normal, or real order traffic, traveling across the same network 202 as simulated order traffic, may be routed through or otherwise accessible to the VIES application 112, and may be passed on to its intended destination uninterrupted and without intervention by the VIES application 112.

Figure 7:
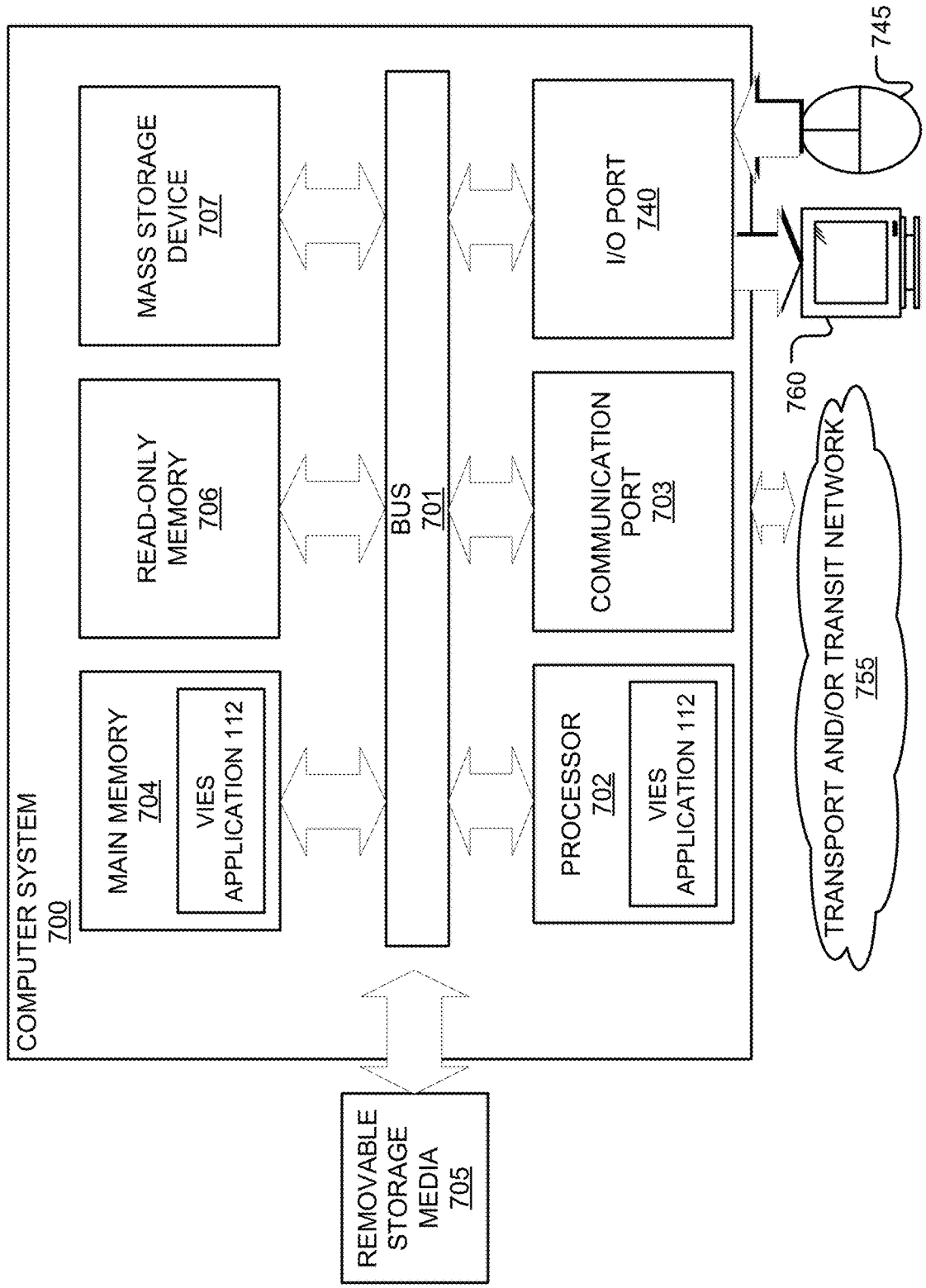
FIG. 7 illustrates an example of a computing system that may implement various services, systems, and methods discussed herein.

FIG. 7 is an example schematic diagram of a computing system 700 that may implement various methodologies discussed herein. For example, the computing system 700 may comprise a computing device used to execute the VIES application 112. The computing system includes a bus 701 (i.e., interconnect), at least one processor 702 or other compute element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a universal serial bus (USB) port. Communication port(s) 703 may be chosen depending on a network such as a Local Area Network (LAN), a Wide Area Network (WAN), or any network to which the computer system 700 connects.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a VIES application 112 that supports functionality as discussed above. The VIES application 112 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the VIES application 112 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of simulating workflows for order entry and management, comprising:
   identifying a request to provision one or more telecommunication services on one or more client premise devices (CPEs), wherein the request is for the one or more CPEs to be deployed with at least one of the one or more telecommunication services;
   connecting a computing device in a network flow path between an enterprise service bus (ESB) and a business process management system (BPMS) such that network traffic associated with orders for provisioning the one or more telecommunications services on the one or more CPEs, the orders being communicated between the BPMS and the ESB flows through the computing device;
   utilizing the computing device comprising at least one processing unit in communication with at least one tangible storage media, the tangible storage media further including computer executable instructions for performing operations of:
   accessing event log data for a previously completed real order from an event log database, the event log data comprising key identification numbers (IDs) and information about one or more tasks previously used for provisioning the one or more telecommunications services on the one or more CPEs, wherein the at least one of the key IDs is associated with the previously completed real order;
   generating simulated order identifiers for the key IDs of the event log data that differentiate real orders from simulated orders;
   generating a template comprising the one or more tasks previously used for provisioning the one or more telecommunications services on the one or more CPEs, the template associated with an order scenario based on the previously completed real order;
   generating a simulated order associated with provisioning the one or more telecommunications services on the one or more CPEs by applying the one or more tasks of the template, the simulated order comprising the simulated order identifiers; and
   executing the simulated order to initiate a simulated workflow associated with provisioning the one or more telecommunications services on the one or more CPEs.

2. The method of claim 1, further comprising orchestrating the network traffic associated with orders with the computing device, by:
   analyzing a data packet of the network traffic associated with orders;
   determining whether the data packet includes at least one of the simulated order identifiers; and
   passing the data packet to its intended destination where the data packet is associated with a new real order and is absent the simulated order identifiers.

3. The method of claim 2, further comprising:
   determining the data packet includes at least one of the simulated order identifiers;
   extracting a request for information from the data packet; and
   responding to the request for information from the data packet by utilizing a predetermined value or the event log data associated with the template.

4. The method of claim 1, wherein the template further comprises an Extensible Markup Language (XML) document with predefined instructions to control a communication flow between the BPMS and the computing device and process the simulated workflow.

5. The method of claim 1, further comprising:
   wherein the BPMS comprises a services frame work and a communications service and defines an order fulfillment system operable to process one or more workflows and tasks associated with the workflows; and
   coupling the computing device to a user interface of the BPMS to allow the computing device to access the user interface and manage tasks of the simulated workflow from the user interface of the BPMS.

6. The method of claim 1, further comprising:
   intercepting network traffic associated with the simulated order executed from the BPMS that comprises a request to query a database of an inventory system; and
   returning a predefined response to the BPMS in response to the request to query the database of the inventory system to simulate interaction with the inventory system.

7. The method of claim 1, further comprising:
   identifying a request for information from the BPMS; and
   generating a response in a form of a payload based on event log data or predetermined values specific to the order scenario.

8. The method of claim 1, wherein the event log database stores information about bidirectional transmissions between an order entry domain and an order management domain.

9. The method of claim 1, further comprising:
   initiating the simulated workflow by the BPMS;
   generating a plurality of tasks of the simulated workflow by the BPMS, the BPMS configured to assign the plurality of tasks to other systems;
   intercepting certain network traffic sent from the BPMS to the other systems as the BPMS communicates with the other systems about a portion of the plurality of tasks; and transmitting a predetermined response to the BPMS for the portion of the plurality of tasks based on event log data or other predetermined instructions of the template.

10. The method of claim 1, further comprising:
modifying the simulated workflow to add an additional task;
querying the event log database for information about previously completed real orders that have implemented the additional task;
retrieving additional event log data for the previously completed real orders that have completed the additional task; and
modifying the template to generate a new simulated order that is associated with the additional task using the additional event log data.

11. The method of claim 1, further comprising displaying the simulated workflow in a graphical user interface to display tasks pending to complete the simulated workflow.

12. A system for simulating workflows for order entry and management, the system configured to:
identify a request to provision one or more telecommunication services on one or more client premise devices (CPEs), wherein the request is for the one or more CPEs to be deployed with at least one of the one or more telecommunication services;
connect a computing device in a network flow path between an enterprise service bus (ESB) and a business process management system (BPMS) such that network traffic associated with orders for provisioning the one or more telecommunications services on the one or more CPEs, the orders being communicated between the BPMS and the ESB flows through the computing device;
utilize the computing device comprising at least one processing unit in communication with at least one tangible storage media, the tangible storage media further including computer executable instructions that, when executed, are configured to:
access event log data for a previously completed real order from an event log database, the event log data comprising key identification numbers (IDs) and information about one or more tasks previously used for provisioning the one or more telecommunications services on the one or more CPEs, wherein the at least one of the key IDs is associated with the previously completed real order;
generate simulated order identifiers for the key IDs of the event log data that differentiate real orders from simulated orders;
generate a template comprising the one or more tasks previously used for provisioning the one or more telecommunications services on the one or more CPEs, the template associated with an order scenario based on the previously completed real order;
generate a simulated order associated with provisioning the one or more telecommunications services on the one or more CPEs by applying the one or more tasks of the template, the simulated order comprising the simulated order identifiers; and
execute the simulated order to initiate a simulated workflow associated with provisioning the one or more telecommunications services on the one or more CPEs.

13. The system of claim 12, wherein the system is further configured to orchestrate the network traffic associated with orders with the computing device, by being configured to:
analyze a data packet of the network traffic associated with orders;
determine whether the data packet includes at least one of the simulated order identifiers; and
pass the data packet to its intended destination where the data packet is associated with a new real order and is absent the simulated order identifiers.

14. The system of claim 13, wherein the system if further configured to:
determine the data packet includes at least one of the simulated order identifiers;
extract a request for information from the data packet; and
respond to the request for information from the data packet by utilizing a predetermined value or the event log data associated with the template.

15. The system of claim 12, wherein the template further comprises an Extensible Markup Language (XML) document with predefined instructions to control a communication flow between the BPMS and the computing device and process the simulated workflow.

16. The system of claim 12,
wherein the BPMS comprises a services frame work and a communications service and defines an order fulfillment system operable to process one or more workflows and tasks associated with the workflows; and
wherein the system is further configured to couple the computing device to a user interface of the BPMS to allow the computing device to access the user interface and manage tasks of the simulated workflow from the user interface of the BPMS.

17. The system of claim 12, wherein the system if further configured to:
intercept network traffic associated with the simulated order executed from the BPMS that comprises a request to query a database of an inventory system; and
return a predefined response to the BPMS in response to the request to query the database of the inventory system to simulate interaction with the inventory system.

18. The system of claim 12, wherein the system if further configured to:
identify a request for information from the BPMS; and
generate a response in a form of a payload based on event log data or predetermined values specific to the order scenario.

19. The system of claim 12, wherein the event log database stores information about bidirectional transmissions between an order entry domain and an order management domain.

20. The system of claim 12, wherein the system if further configured to:
initiate the simulated workflow by the BPMS;
generate a plurality of tasks of the simulated workflow by the BPMS, the BPMS configured to assign the plurality of tasks to other systems;
intercept certain network traffic sent from the BPMS to the other systems as the BPMS communicates with the other systems about a portion of the plurality of tasks; and
transmit a predetermined response to the BPMS for the portion of the plurality of tasks based on event log data or other predetermined instructions of the template.

21. The system of claim 12, wherein the system if further configured to:
modify the simulated workflow to add an additional task;

query the event log database for information about previously completed real orders that have implemented the additional task;

retrieve additional event log data for the previously completed real orders that have completed the additional task; and modify the template to generate a new simulated order that is associated with the additional task using the additional event log data.

22. A non-transitory computer readable media comprising computer executable instructions for simulating workflows for order entry and management, the computer executable instructions, when executed by at least one processor, perform operations comprising:

identifying a request to provision one or more telecommunication services on one or more client premise devices (CPEs), wherein the request is for the one or more CPEs to be deployed with at least one of the one or more telecommunication services;

connecting a computing device in a network flow path between an enterprise service bus (ESB) and a business process management system (BPMS) such that network traffic associated with orders for provisioning the one or more telecommunications services on the one or more CPEs, the orders being communicated between the BPMS and the ESB flows through the computing device;

accessing event log data for a previously completed real order from an event log database, the event log data comprising key identification numbers (IDs) and information about one or more tasks previously used for provisioning the one or more telecommunications services on the one or more CPEs, wherein the at least one of the key IDs is associated with the previously completed real order;

generating simulated order identifiers for the key IDs of the event log data that differentiate real orders from simulated orders;

generating a template comprising the one or more tasks previously used for provisioning the one or more telecommunications services on the one or more CPEs, the template associated with an order scenario based on the previously completed real order;

generating a simulated order associated with provisioning the one or more telecommunications services on the one or more CPEs by applying the one or more tasks of the template, the simulated order comprising the simulated order identifiers; and executing the simulated order to initiate a simulated workflow associated with provisioning the one or more telecommunications services on the one or more CPEs.

* * * * *